United States Patent [19]
Van Der Sande et al.

[11] 3,742,285
[45] June 26, 1973

[54] IMAGE INTENSIFIER DISPLAY SYSTEM

[75] Inventors: Jan J. Van Der Sande, Manhasset; Johan H. Deltrap, Smithtown, both of N.Y.

[73] Assignee: Astrophysics Research Corporation, Los Angeles, Calif.

[22] Filed: Sept. 27, 1971

[21] Appl. No.: 184,285

Related U.S. Application Data

[63] Continuation of Ser. No. 832,584, June 12, 1969, abandoned.

[52] U.S. Cl.............................. 315/12, 315/11, 313/95, 250/213 VT
[51] Int. Cl............................................ H01j 29/41
[58] Field of Search.............................. 315/11, 12; 313/68 A, 95; 250/213 VT

[56] References Cited
UNITED STATES PATENTS

| | | |
|---|---|---|
| 3,244,921 | 4/1966 | Behun.................................. 313/94 |
| 3,356,851 | 12/1967 | Carlson......................... 250/213 VT |
| 3,383,514 | 5/1968 | Dolon et al........................ 313/96 X |
| 3,280,356 | 10/1966 | Stoudenheimer et al......... 313/94 X |

Primary Examiner—Carl D. Quarforth
Assistant Examiner—P. A. Nelson
Attorney—Edward A. Sokolski

[57] ABSTRACT

This invention relates to the art of imgge intensifier display systems including an electronic image intensifier display tube having fiber optic input window with an electron omitting surface and a display window of larger diameter having a phosphor coated surface to provide a magnified image of a scene being viewed.

29 Claims, 5 Drawing Figures

PATENTED JUN 26 1973 3,742,285
FIG.1
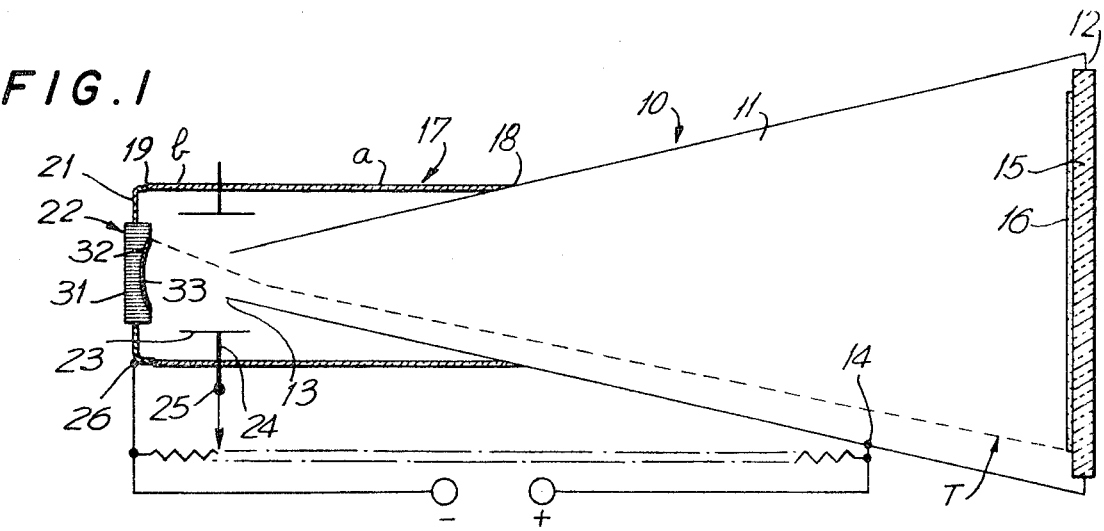
FIG.2
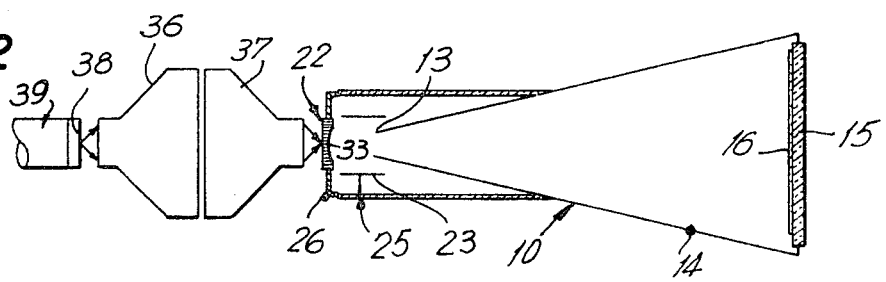
FIG.3
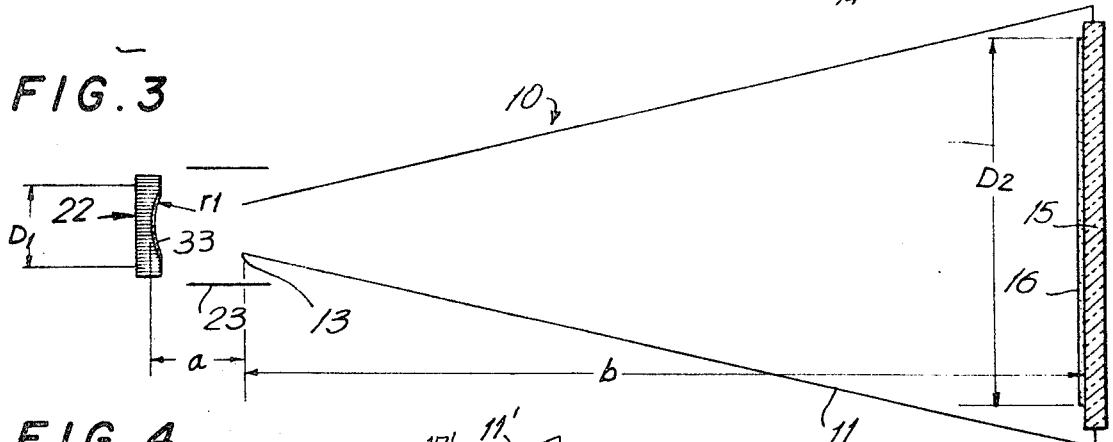
FIG.4
FIG.5
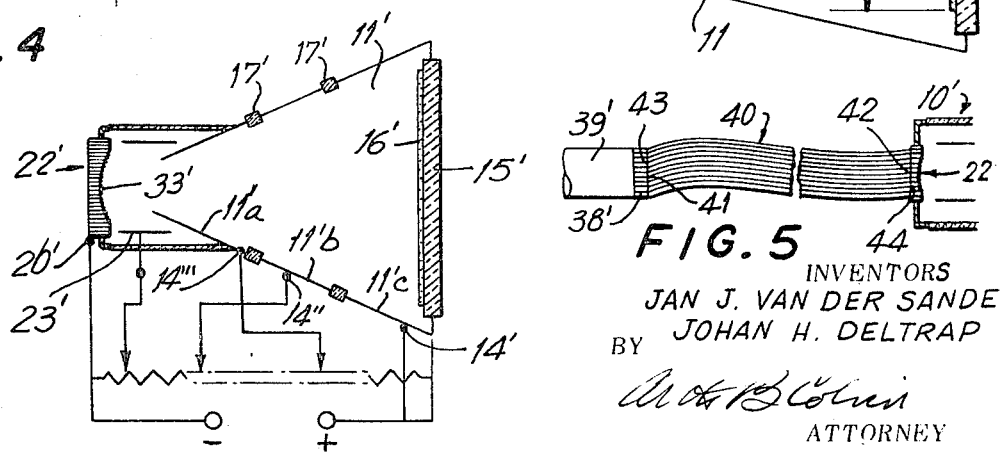
INVENTORS
JAN J. VAN DER SANDE
JOHAN H. DELTRAP
BY
ATTORNEY

IMAGE INTENSIFIER DISPLAY SYSTEM

This is a continuation of application Ser. No. 832,584, filed June 12, 1969, and now abandoned.

As conducive to an understanding of the invention, it is noted that there are many conditions in which it is essential that an observer be able to view a scene or an object which has a minimum of illumination, which is not sufficient for unaided viewing to be accomplished.

Basically, two types of low light level devices or systems working in the visible and/or near infrared part of the spectrum are in use. These systems make use of available ambient light such as moon or starlight and do not require the use of auxiliary light sources which in many applications would either not be available or which could not be employed. Thus, for example, where the system is used for military purposes such as on a patrol boat crusing at night, the use of searchlights, for example, would make the patrol boat a ready target. Furthermore, if there is a bright moon, the patrol boat would also be a ready target and might not be used during such period. Accordingly, the system necessarily must be one that will function with a minimum of ambient light such as starlight so that the patrol boat will not be visible at a short distance.

The two systems which are generally employed may be direct view systems or television systems.

Direct view systems normally consist of an objective lens, one or more stages of light amplification such as are provided by conventional low level light devices employing image intensifier tubes and an eyepiece. Such systems are relatively low in cost. However, an eyepiece, which may be either of the monocular or biocular type, creates high fatigue to the observer when it is used for any length of time. Furthermore, an eyepiece can only be utilized at any given time by one observer to view the intensified image and the inability of having a number of observers able to view the scene at the same time severely limits the usefulness of the device on a patrol boat, for example, where the helmsman who may be using the device to assist in steering the vessel, must at the same time orally report his observations to the captain of the vessel to alert the captain as to any conditions of which he must be apprised.

A television system on the other hand may present an intensified image on a large screen so that more than one observer may view the image at the same time and the observer is capable of performing other functions simultaneously with viewing the night scene, such as observing the instrument panel of a vessel or of an aircraft. A television system thus is far more desirable than the conventional direct view system in that not only is fatigue sharply reduced, but more than one observer can view the scene.

However, since television systems use relatively complex amplifying system, sweep circuits and the like, which require hundreds of components, they are relatively delicate, and due to the nature of military operations, may, for example, be subject to extremes of temperature and humidity as well as to shock and impact. Thus, such systems not only are not as reliable as direct viewing systems, but are larger in size, heavier in weight and require intensive and thus costly maintenance in addition to their higher acquisition costs.

Where, to improve the viewing conditions with direct view systems, in an attempt to reduce fatigue, a high relative aperture lens providing bi-ocular viewing is coupled to the output phosphor screen of the last stage tube of a conventional low light level intensifier device in order to provide a magnified image, since the phosphor screen in conventional intensifier tubes has a diameter for example of 1 inch, a lens suitable for use therewith would have a relative aperture of $f/0.75$. Since lenses of this extreme relative aperture can only cover a limited field of view, illustratively 20°, the focal length of this lens would have to be in the order of 3 inches (or 75 mm) to view the 1 inch diameter screen. Since 250 mm is the internationally accepted standard reading distance, the magnification achieved by such lens is thus only 250/75 or 3.33 $x$.

Moreover, the eyes of the observer would have to be positioned very close to the lens, say within 1 inch to 1 ½ inches in order that the observer could be able to see the total field of view. As a result, only one observer can view the screen at any one time and due to the proximity of the eyes of the observer to the lens, even with biocular viewing, since the head cannot be moved freely, fatigue would still occur.

Where the system above described employing the high relative aperture lens is utilized in association with a rear projection screen to permit an observer to view the front of the screen, certain advantages are present. Thus, the eyes of the observer can be positioned at a convenient distance from the front of the rear projection screen to avoid fatigue and more than one observer can view the scene on the projection screen.

However, in a system using, for example, a high relative aperture lens with a relative aperture of $f/0.75$ which magnifies the image on the output phosphor screen of the last stage of the low light level device by 3.33 X as previously described, the brightness of the scene projected on the screen with such magnification is at least thirty times less than the brightness of the image on the output phosphor screen. If the spacing between the elements of such system are changed to increase the magnification, the brightness would decrease by the square of magnification. Consequently, such a rear projection type system would only be suitable if sufficient light is available from the last stage of the low light level device and this is a function of not only the amplification of such device, but the level of illumination of the scene being viewed.

Where a system is employed utilizing in addition to a high relative aperture lens, a field lens located at the plane of the real image formed by the high relative aperture lens of the image on the output phosphor screen to permit biocular viewing of the entire field of view, and the field lens is directly viewed by the observer, there are certain advantages and disadvantages present. Thus, assuming a magnification of 3.33X as in the previously described methods and the F number of the relative high aperture lens to have a value of 0.75; by the formula $M = 250/FX\phi$ where $M =$ the magnification; $F =$ the $f$ number of the lens and $\phi =$ diameter of pupil of eye in millimeters at the location of the observer's eye;

$\phi = 250/0.75 \times 3.33 = 100$.

The pupil diameter $\phi$ will thus be 100 mm which is enough to accommodate both eyes of the observer.

The method has the advantage that the eyes of the observer do not have to be positioned close to any part of the lens system, but they do have to be placed within the diameter $\phi$ above noted so that only one observer can view the scene.

The systems above described thus have one or more of the following deficiencies:

a. They have limited magnification;
b. They have limited freedom of movement of the eyes;
c. Only one observer can see the scene except for the system using the rear view screen and in such case there is a severe light loss;
d. Furthermore, inversion of the image will occur where a rear projection screen is used or where a field lens is used unless additional lens systems are employed with attendant great reduction in brightness and increase in cost.

It is accordingly among the objects of the invention to provide an image intensifier display tube which will furnish desired magnification of the scene being viewed with a minimum loss of light, which display tube is relatively simple in construction, small in size and not likely to become deranged, even after long use, which is relatively light in weight and relatively inexpensive in cost and which will permit viewing of the displayed image by a large number of observers.

Another object of the invention is to provide an image intensifier display tube of the above type which may readily be used in combination with one or more stages of light amplification to provide not only a magnified image of the scene being viewed, but an image of desired brightness without need for artificial illumination of the scene being viewed but only the presence of ambient light.

According to the invention, the display tube comprises a vacuum envelope, including a substantially conical chamber, having a phosphor coated viewing window at its larger diameter end and a fiber optic input window with a concave inner surface axially aligned with the small diameter and of said chamber, said concave inner surface having a photo-emitting coating. The chamber defines the anode of an electronic tube, the cathode of which is defined by the photo-emitting coating, a focusing member being provided between the cathode and the small diameter end of the conical chamber.

In the accompanying drawings in which are shown one or more of various possible embodiments of the several features of the invention;

FIG. 1 is a diagrammatic longitudinal sectional view of an image intensifier display tube according to one embodiment of the invention, FIG. 2 is a diagrammatic view showing a system incorporating optical coupling means between a low light level image intensifier device and the display tube of FIG. 1, FIG. 3 is a diagrammatic view of the display tube of FIG. 1 illustrating the parameters thereof, FIG. 4 is a longitudinal sectional view of a display tube according to another embodiment of the invention, and FIG. 5 is a fragmentary diagrammatic longitudinal sectional view of still another embodiment of the invention.

Referring now to the drawings, as shown in FIG. 1, the display tube 10 comprises a conical chamber 11 having an enlarged diameter mouth 12 and a small diameter inlet end 13. The chamber 11 may be of conductive material or have a conductive coating on its inner surface with an insulating encompassing container to define the anode of the tube. In either event, the inner surface of the chamber 11 has a terminal 14 to which a source of potential may be connected in the manner hereinafter to be described.

Affixed in the mouth or output end 12 of the chamber 11 is a glass window 15 which may be of the type utilized in conventional cathode ray tubes and in the illustrative embodiment herein has a luminescent coating 16 of phosphor deposited on its inner surface which in conventional manner is covered with a thin layer of aluminum. As the construction of such a window is well known to those skilled in the art, it will not be further described.

Encompassing the small diameter end 13 of the chamber 11 and coaxial therewith is a cylinder 17 of insulating material illustratively of glass, the inner end 18 of which is sealed to the wall of the chamber 11.

The outer end 19 of the cylinder 17 has sealed thereto a metal ring 21, which carries a fiber optic input window 22 which is axially aligned with the conical chamber 11 and the output window 15. Thus, a completely sealed envelope is provided comprising the cylinder 17, the chamber 11, and the window 15 and metal ring 21 with its fiber optic window 22. The interior of the envelope may be evacuated in conventional manner to create a vacuum therein.

Positioned in the glass cylinder 17 so as to encompass the inlet end 13 of the conical chamber 11 and axially aligned therewith, is a metal focusing sleeve 23 which is supported by a ring 24. As shown, the glass cylinder 17 has two separate cylindrical portions 17a and 17b, the portion 17a being sealed between the ring 24 and the conical chamber 11 and the portion 17b being sealed between the ring 24 and the ring 21. A terminal 25 is connected to the ring 24 and a terminal 26 is connected to the metal ring 21.

The fiber optic window 22 is composed of a bunch of fiber optic strands. The outer surface 31 of said fiber optic input window 22 is flat, extending at right angles to the longitudinal axis of the display tube 10. The inner surface 32 of said input window 22 is concave and has a photo-emitting coating 33 thereon which defines the cathode of the tube and which, for example, may consist of cesium-antimonide or may be the well known S-20 tri-alkali photocathode ($Na_2KSb(S)$).

More particularly, the fiber optic input window comprises a bundle of slender filaments of glass or the like. The individual fibers serve to conduct unit portions of the image projected on the ends of the fibers defining the flat outer surface of the window to the opposite inner ends of the fibers which define the concave inner surface of the window. Thus, spreading of the light and loss of image definition are avoided.

As the construction of the fiber optic window is conventional and well known to those skilled in the art, it will not be further described.

However, other types of photocathodes can be employed depending upon the application of the unit. In any event, the function of the photocathode is to cause electrons to be emitted therefrom when light rays pass through the fiber optic window 22.

In the operation of the tube, the photo-emitting coating 33 which is connected to the metal ring 21 has a source of negative potential applied thereto through terminal 26. The positive side of a DC high voltage supply is connected to the terminal 14 which in turn is connected not only to the conductive inner surface of the chamber 11, but also to the phosphor coating 16 of window 15. The focusing sleeve 23, which defines a grid, is supplied with a potential at its terminal 25 which is just slightly positive with respect to the potential applied to the photo-emitting cathode 33.

As a result, when light passing through the fiber optic window 22 strikes the photocathode 33, electrons will be emitted from the illuminated areas and accelerated to the phosphor screen 16. An electron trajectory is shown, for example, at T in FIG. 1.

The dimensions of the display tube 10 are selected (FIG. 3) so that the diameter of the image on the phosphor coating 16 ($D_2$) is larger than the diameter of the image on the photo-emitting coating 33 ($D_1$). The ratio D2/D1 of these two diameters is the magnification $M$ of the tube.

The brightness gain obtainable with the image intensifier display tube shown in FIG. 1, follows the conventional laws of all image intensifier tubes, i.e., the brightness gain is equal to the lumen gain of the tube divided by the magnification squared, or: $BG = L.G./M^2$ In a typical example, the lumen gain value obtainable for white light (for example having a color temperature of 2,870° Kelvin) with an image intensifier tube having an S20 (multi-alkali) photocathode 33, a zinc-cadmium sulfide phosphor output window 15 and a total operating voltage of between 25,000 to 30,000 volts can be in the order of 200 to 300. Thus, to provide a brightness gain (B.G.) equal to unity the magnification of the tube for white light can amount to from approximately 14x to 17.3x. For green light which would be present in the event that the image intensifier display tube is coupled to an image intensifier tube of conventional type, where the lumen gain would be in the order of 100 to 150, the magnification of the display tube could be from approximately 10x to 12.2x in order to maintain a brightness gain equal to unity.

If the magnification M of the tube is smaller than the above values, a brightness gain greater than unity will result.

Thus, it is clear that even with green light, a magnification of 10 times can be achieved with no loss of brightness resulting from such magnification and the image is of course displayed on a large screen or window so that it may be viewed by one or more observers directly and without the need for any eye-pieces or the like.

In the embodiment shown in FIG. 1, the input window 22 may have the light from the scene being viewed, directly projected thereon through a conventional optical lens. However, in most applications it is necessary to have greater intensification of the light than can be accomplished by a single unit such as the display tube 10, shown in FIG. 1. In such case, as illustratively shown in FIG. 2, the input window 22 of the display tube 10 is optically coupled by high relative aperture lenses 36, 37 to the output screen 38 of a last stage image intensifier tube 39 of a low light level device. Since such low light level device is of conventional type having a conventional phosphor coated output screen or window 38, no further description thereof is believed necessary.

The optical coupling between the output screen 38 and the input window 22 through the lenses 36, 37 may be performed in conventional manner so as to have unity magnification. Thus, the image diameter of screen 38 will be equal to that of the image diameter projected onto the input window 22 of the display tube 10. However, the intensity of the light projected on the window 22 is of course greater by reason of the prior low light level devices 39 in the system, than it would be if the light from the scene was directly focused on window 22 through a conventional optical lens.

More particularly, if lenses 36, 37 have a relative aperture of $f/0.75$, their coupling efficiency amounts to approximately one-fourth. If the mangification $M$ of display tube 10 is equal to $5x$, the brightness of the phosphor screen 16 can be equal to or $1.5x$ greater than the brightness of the screen 38.

This can readily be seen from the following where the screen 38 displays green light with the display tube 10 having a lumen gain in the order of 100 to 150.

$B.G. = LG/M2 = 100/5^2 = 4 \; ; = 150/5^2 = 6$

As the coupling efficiency of the lenses 36, 37 between screen 38 and input window is one-fourth, the brightness gain ($BG$) is equal to unity if the lumen gain ($LG$) is 100 and 1.5 if the lumen gain is 150.

As a result, the display tube 10 provides good magnification so that more than one observer can view the scene appearing on the screen 16 and such advantages are provided without loss of light resulting from the optical coupling between the image intensifier tube 39 and the viewing screen 16.

Furthermore, the provision of the two lenses 36 and 37 will provide an orientation of the image on the viewing window 15 that is identical to its orientation on the screen 38.

It is essential that the display tube 10 shown in FIGS. 1 and 2 be provided with a fiber optic window 22.

Thus, in a typical display tube, according to the invention and referring to FIG. 3, the following parameters may be utilized:

$D_1$ = diameter photocathode = 1 inch
$D_2$ = diameter phosphor screen = 5 inches, thus
$M$ = magnification = 5
$a$ = distance cathode to anode tip = 1.2 inches
$b$ = distance anode tip to screen = 11.7 inches
$r_1$ = radius of concave cathode surface = 1.04 inches In a tube having a total inside length of $a + b = 12.9$ inches, the radius of the concave surface of the cathode has to be approximately 1.04 inches. With such a curvature the tube has excellent off-axis resolution of the image on the screen 15, i.e., good image quality over the total field.

Also the distortion in the magnified image is kept within acceptable limits, i.e., approximately 7 percent. A reduction in tube length could be realized by reducing the values of both $a$ and $b$, while approximately maintaining the relationship 10 $a = b$ for a tube with magnification $M = 5$. However, this length reduction would substantially increase the amount of pin-cushion distortion in the image.

With $r$ having a larger value than 1.04 inches in a tube of the length indicated, there will be lower resolution performance off-axis.

If a glass window should be used for the cathode input window, in order for the tube resolution to be the same as a tube equipped with a fiber optic window, the radius of curvature of the cathode input window would also have to be 1.04 inches.

Since display tubes of the type involved require the use of prior light level intensifier devices, optical coupling is required. Due to the relatively high degree of curvature of the cathode that is required, the present state of the art will not permit the use of existing lenses.

Furthermore, in the present state of the art it is not feasible to design lenses of high relative aperture with a strong image curvature in which the image is curved away from the in-falling light rays while good resolution is maintained over the entire field of view.

If the radius of the photocathode is increased to facilitate optical coupling with existing lenses, then in order to maintain a good off-axis resolution performance of the tube, the length of the tube would have to be increased in approximately the same ratio as the increase in radius.

This increase in length of the tube would lead to an impractical device as can be seen from the given example where the inside tube length amounts to $a + b = 12.9$ inches for a 1 inch input diameter and a magnification $M = 5$.

However, a display tube of the type herein described utilizing a fiber optic window is of length within practical limits.

By the use of a fiber optic input window of the type described in which the inner surface is concave and the outer surface is flat, conventional lens coupling such as shown in FIG. 2 can be used, such conventional lenses being corrected for a flat field.

As shown in FIG. 5, the use of the fiber optic input window permits direct fiber optical coupling of the display tube 10' with a previous stage 39' of light amplification, provided this previous stage is equipped with a fiber optic output screen or window 38', which has a conventional phosphor coated inner surface. More particularly, the coupling of the display tube 10' to a previous stage of light amplification 39' may be accomplished by means of a flexible fiber optic cable or rope 40, the ends 41, 42 of which are ground so as to present a flat surface that may abut against the correspondingly flat outer surfaces 43, 44 of output window 38' and input window 22' of display tube 10' respectively. With such arrangement a semi-remote location of the display tube becomes possible.

Where it is desirable substantially to decrease the tube length while maintaining the distortion at a minimum, the display tube may have a slightly more complex configuration as shown in FIG. 4. Such a shorter tube is extremely desirable where the display tube is used on the instrument panel of an aircraft or in a tank for night flying or maneuvering and where space is at a premium.

It is essential that distortion values be kept to a minimum for proper interpretation and ease of viewing by the observer.

Referring to the embodiment shown in FIG. 4, in which elements corresponding to those in FIG. 1 have the same reference numerals primed, the conical chamber 11' which defines the anode is divided into three separate sections 11'a, 11'b and 11'c connected by insulating sleeves 17' illustratively of glass.

The phosphor coating 16' on the window 15' is connected to anode section 11'c and this section is connected to a terminal 14'.

The sections 11'b and 11'a are connected to terminals 14'', 14''' respectively. The most positive potential is applied to the terminal 14', i.e., to the end anode section 11'c. The terminal 14'' connected to the middle anode section 11'b is at a lower potential than that of both adjoining sections 11'a and 11'c, connected to terminals 14''' and 14'. The focusing grid 23' is at still a lower potential which can be more positive, equal to or negative with respect to the potential applied to terminal 26' connected to the photocathode 33' of input window 22'.

As a result of the foregoing arrangement, the control anode section 11'b becomes a de-cellerating electrode.

The embodiment shown in FIG. 4 will lead to shorter length display tubes, since the distance between cathode and the tip of the anode can be selected smaller, still maintaining a distortion in the image which is within acceptable limits.

Thus, in a typical display tube according to the embodiment shown in FIG. 4 and referring to FIG. 3 for the identification of a number of symbols, the following parameters may be utilized:

$D_1$ = diameter photocathode = 1 inch
$D_2$ = diameter phosphor screen = 5 inches, thus
$M$ = magnification = 5
$a$ = distance cathode to anode tip = 0.78 inches
$b$ = distance anode tip to screen = 7.4 inches
$r_1$ = radius of concave cathode surface = 0.65 inches In this manner a display tube is obtained, having a 1 inch image input diameter, a magnification $M = 5$ and a total inside length of $a + b = 8.18$ inches, whereby the distortion of the image amounts to the acceptable value of 6 percent. The embodiment of FIG. 4, i.e., the electrode configuration executed as a "pentode," with an electrical potential distribution as indicated previously, therefore leads to a 4.72 inch length reduction as compared to the display tube executed with an electrode configuration as a "triode" and shown in FIG. 1.

With the arrangements above described, an image intensifier display tube is provided which will produce a magnified image of the scene that would normally appear on the output window of a conventional image intensifier device without loss of brightness in the scene being displayed and permitting viewing of the scene by one or more observers without eye strain and with a minimum of distortion at the edges of the screen being viewed.

What is claimed is:

1. An image intensifier electronic display tube comprising a vacuum envelope having at one end thereof a fiber optic input window, said input window having a substantially flat outer surface and a concave inner surface having a photo-emitting coating defining a photocathode the radius of curvature of said photocathode being substantially equivalent to the diameter thereof; means to impart motion to the electrons emitted from said photocathode; means to focus the electrons emitted from said photocathode; and a luminescent window at the end of said vacuum envelope opposite said input window, said luminescent window of greater size than said input window and positioned a sufficient distance from said input window to provide, on said luminescent window, a magnified image of the scene on said outer surface of said input window.

2. The combination set forth in claim 1 in which optical means are provided to focus an image onto said outer surface of said input window.

3. The combination set forth in claim 1 in which the magnification of the image provided by the image intensifier display tube has a value between 2 and 10.

4. The combination set forth in claim 1 in which a low light level electronic image intensifier tube is provided having an output window longitudinally aligned with said input window and means are provided optically to couple said output window and said input window 5. The combination set forth in claim 4 in which said optical coupling means has substantially a unity magnification, whereby the image diameter of said output window is substantially equal to that of the image diameter projected onto said input window.

6. The combination set forth in claim 4 in which said optical coupling means comprises a pair of high relative aperture lenses interposed between said output window and said input window.

7. The combination set forth in claim 4 in which said image intensifier tube is equipped with a fiber optic output window, which window is placed directly against the fiber optic input window of the display tube.

8. The combination set forth in claim 4 in which said image intensifier tube has a fiber optic output window and the means optically to couple the output window of the image intensifier tube to said input window comprises a fiber optic cable.

9. The combination set forth in claim 8 in which the outer surfaces of said output window and of said input window and of the ends of said fiber optic cable are respectively ground to present a flat surface, said outer surfaces of said output window and of said input window abutting against the corresponding ends of said fiber optic cable.

10. The combination set forth in claim 1 in which said motion-imparting means comprises an anode having one or more substantially axially aligned sections, said sections each having a shape substantially equivalent to a surface of revolution, said luminescent window being in proximity to one end of said anode and said photocathode being axially aligned with said anode and longitudinally displaced from the opposite end thereof, said focussing means being located, at least in part, between said photocathode and said anode.

11. The combination set forth in claim 10 in which said anode comprises one substantially frusto-conical section, said luminescent window being at the large diameter end thereof.

12. The combination set forth in claim 11 in which said input window and said luminescent window are in planes perpendicular to the longitudinal axis of said anode, and said photocathode is co-axial with said anode.

13. The combination set forth in claim 12 in which said focussing means comprises a conductive element, the configuration of said conductive element being substantially equivalent to a surface of revolution, said conductive element being substantially co-axial with said anode, whereby when said anode is rendered positive with respect to said conductive element and said conductive element is rendered positive, negative or equal in potential with respect to said photocathode, the electrons emitted from said photocathode will be accelerated and focussed on said luminescent window.

14. The combination set forth in claim 13 in which said photocathode has a diameter of approximately 1 inch and a radius of curvature of approximately 1 inch, the distance between said photocathode and the smaller diameter end of said anode is approximately 1 inch and the length of said anode is approximately 11 inches.

15. The combination set forth in claim 10 in which said anode comprises a plurality of sections and said focussing means comprises a conductive element, the configuration of said conductive element being substantially equivalent to a surface of revolution, said conductive element being substantially co-axial with said anode.

16. The combination set forth in claim 15 in which said anode comprises three sections.

17. An image intensifier electronic display tube comprising
a vacuum envelope having at one end thereof a fiber optic input window, said input window having a substantially flat outer surface and a concave inner surface having a photo-emitting coating defining a photocathode;
means within said envelope to impart motion to the electrons emitted from said photocathode, said motion-imparting means comprising an anode having three axially aligned sections, said sections each having a shape substantially equivalent to a surface of revolution, said photocathode being axially aligned with said anode and longitudinally displaced from the end thereof nearest said input window;
a focussing element located, at least in part, between said photocathode and said section of said anode nearest said input window, said focussing element adapted to focus the electrons emitted from said input window and having a configuration substantially equivalent to a surface of revolution; and
a luminescent window at the end of said vacuum envelope opposite said input window, said luminescent window of greater size than said input window and positioned a sufficient distance from said input window to provide, on said luminescent window, a magnified image of the scene on said outer surface of said input window;
the initial section of said anode adjacent said focussing element and the final section of said anode adjacent said luminescent window being at higher operating potentials than the intervening section of said anode and said focussing element.

18. The combination set forth in claim 17 in which the operating potential of said intervening anode section is equal to that of said focussing element; and the operating potential of said final anode section is equal to that of said initial anode section.

19. The combination set forth in claim 18 in which said focussing element is at ground potential.

20. An image intensifier electronic display tube comprising
a vacuum envelope having at one end thereof a fiber optic input window, said input window having a substantially flat outer surface and a concave inner surface having a photo-emitting coating defining a photocathode;
means within said envelope to impart motion to the electrons emitted from said photocathode, said motion-imparting means comprising an anode having three axially aligned sections, said sections each having a shape substantially equivalent to a surface of revolution, said photocathode being axially aligned with said anode and longitudinally displaced from the end thereof nearest said input window;
a focussing element located, at least in part, between said photocathode and said section of said anode nearest said input window, said focussing element adapted to focus the electrons emitted from said input window and having a configuration substantially equivalent to a surface of revolution; and a luminescent window at the end of said vacuum envelope opposite said input window, said luminescent window of greater size than said input window and positioned a sufficient distance from said input window to provide, on said luminescent window, a magnified image of the scene on said outer surface of said input window;

the minimum cross-sectional area of the final section of said anode, taken in a plane perpendicular to the longitudinal axis of said final section, being greater than the maximum cross-sectional area of the middle anode section, similarly measured; and the minimum cross-section area of said middle anode section, similarly measured, being greater than the maximum cross-sectional area of the remaining anode section, adjacent said focussing element, similarly measured.

21. The combination set forth in claim 20 in which the operating potential of said final anode section is equal to that of said remaining section of said anode; and the operating potential of said middle anode section is equal to that of said focussing element.

22. The combination set forth in claim 21 in which said focussing element is at ground potential.

23. An image intensifier electronic display tube comprising a vacuum envelope having a fiber optic input window at one end having a relatively flat outer surface and a concave inner surface having a photo-emitting coating thereon defining a photocathode, a substantially conical chamber axially aligned with said input window and of smaller diameter at its inner end adjacent said input window than at its outer end, said conical chamber comprising three axially aligned conductive sections electrically insulated from each other and defining an anode, a luminescent window positioned at the larger diameter end of said conical chamber, extending parallel to said input window and axially aligned therewith to provide a magnified image on said luminescent window of the scene on said fiber optic input window, means to apply a higher operating potential to said two outer sections of said conical chamber than to the intervening section, and means to focus the electrons emitted from said photocathode that impinge on said luminescent window.

24. The combination set forth in claim 23 in which the diameter of the luminescent window is greater than that of said photocathode to provide a magnification of the image appearing on said luminescent window of from 2 to 10 times.

25. The combination set forth in claim 23 in which a low light level electronic image intensifier tube is provided having an output window longitudinally aligned with said fiber optic input window and means are provided optically to couple said output window and said fiber optic input window.

26. The combination set forth in claim 23 in which a low light level electronic image intensifier tube is provided having an output window longitudinally aligned with said fiber optic input window, optical means having substantially a unity magnification are provided to couple said output window and said fiber optic input window, whereby the image diameter of said output window of said image intensifier tube is substantially equal to that of the image diameter projected onto the fiber optic input window.

27. The combination set forth in claim 26 in which said optical coupling means comprises a pair of high relative aperture lenses interposed between the output window of said image intensifier tube and said fiber optic input window.

28. The combination set forth in claim 25 in which said image intensifier tube is equipped with a fiber optic output window, which window is placed directly against the fiber optic input window of the display tube.

29. The combination set forth in claim 25 in which said image intensifier tube is equipped with a fiber optic output window and whereby the optical coupling means comprises a flexible fiber optic cable.

* * * * *